No. 817,737. PATENTED APR. 10, 1906.
B. G. GOBLE.
BALL BEARING.
APPLICATION FILED AUG. 18, 1904.
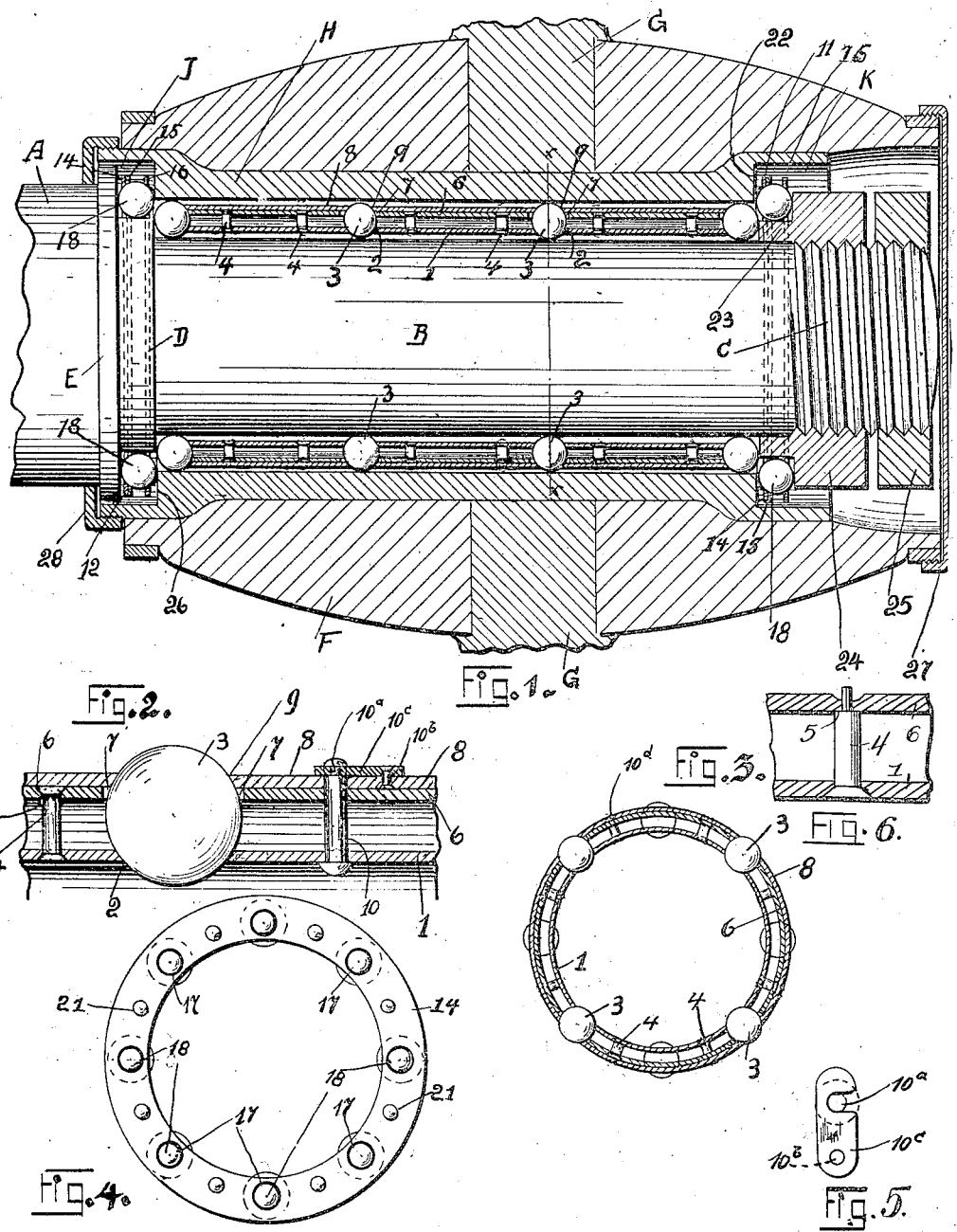

UNITED STATES PATENT OFFICE.

BERT G. GOBLE, OF ALLEGHENY, PENNSYLVANIA.

BALL-BEARING.

No. 817,737.

Specification of Letters Patent.

Patented April 10, 1906.

Application filed August 18, 1904. Serial No. 221,207.

*To all whom it may concern:*

Be it known that I, BERT G. GOBLE, a citizen of the United States of America, residing at Allegheny, in the county of Allegheny and State of Pennsylvania, have invented certain new and useful Improvements in Ball-Bearings, of which the following is a specification, reference being had therein to the accompanying drawings.

This invention has relation to ball-bearings, and more particularly to that class of ball-bearings which are adapted to be used in connection with the spindles of axles, shafts, and the like; and the object of this invention is to dispense with the cups and cones commonly used and provide a perfect bearing without grooves or guideways for the balls.

Another object of this invention is to provide novel means whereby a plurality of balls may be supported upon any-sized parallel surfaces, the number of balls depending upon the weight which they are to carry.

The invention finally resides in the novel construction, combination, and arrangement of parts, which will be hereinafter more fully described and then specifically pointed out in the claims.

Referring to the drawings accompanying this application, Figure 1 is a longitudinal sectional view of my improved ball-bearing, showing the same in connection with a spindle of an axle and the hub of a wheel. Fig. 2 is an enlarged detail view of the ball-retaining sleeve. Fig. 3 is a vertical transverse sectional view taken on the line $x\ x$ of Fig. 1. Fig. 4 is a side elevation of the ball-retaining rings employed in connection with the end thrusts. Fig. 5 is a top plan view of a hook or latch arm employed to lock a retainer-sleeve in position. Fig. 6 is an enlarged detailed sectional view of a part of the bearing, showing how two of the sleeves thereof are spaced apart and held in the spaced position.

Throughout the several views of the drawings similar reference characters designate corresponding parts, and the reference character A designates an axle having formed integral therewith a spindle B, which is threaded upon its outer end, as indicated at C. The axle is provided near the spindle with a shoulder D and a collar E.

The reference character F designates a hub of a wheel having spokes G G mounted therein, and in the hub is secured the bearing-sleeve H, which is provided with an annular recess in each end, as designated by the reference characters J and K.

The bearing-sleeve H shown in Fig. 1 of the drawings is of a type to be used in connection with built-up hubs—that is, wooden hubs composed of a plurality of sections to be assembled and secured together.

The parts above described are of a particular construction, and by employing the same in connection with my improved ball-bearing I have provided efficient means whereby an equal bearing is maintained, particularly where the weight is sustained directly under the spokes, and a perfect bearing embodied for the end thrusts of spindles, shafts, and the like. It will be observed from Fig. 1 of the drawings that I have employed a spindle for my improved bearing which is of a particular construction—namely, being one diameter throughout its entire length. The advantage of this construction will be hereinafter more fully described.

To put my invention into practice, I provide three members or elements, which in the construction shown in Figs. 1, 2, and 3 comprises a sleeve 1, provided with circumferentially and longitudinally arranged rows of openings 2, the walls of which openings form seats for the balls 3, and the said openings are of a size to permit the said balls to project through the openings for some distance, but are of less diameter than the greatest diameters of the balls. In practice the openings 2 are generally arranged much closer together in their circumferential arrangement than in the longitudinal arrangement. The sleeve or member 1 carries or has secured therein the plurality of rivets 4, also arranged in rows circumferentially and longitudinally of the sleeve, and at their outer ends these rivets are provided with shoulders 5, upon which rests a member or sleeve 6 of greater diameter than the member or sleeve 1 and surrounding the latter. This sleeve 6 is provided with circumferentially and longitudinally arranged rows of openings 7, which are of a diameter at least equal to the greatest diameter of the balls 3, the apertures or openings 7 registering with the apertures or openings 2. A third sleeve or member 8 surrounds the sleeve or member 6 and forms a retainer by means of which the balls are retained in the apertures of the sleeves or members 1 and 6. This retainer 8 has openings 9 of substantially the same size as the openings 2 in the sleeve or member 1, and the walls of the openings 9 are so shaped as to fit with the arc of the balls, the said openings being of a size to permit the balls to project some distance therethrough.

The retainer is held against movement by means of one or more rivets or pins 10, secured in the sleeve or member 1 and of a length to project through the sleeve or member 6 and the sleeve or member 8, the portion thereof that projects beyond the sleeve or member 8 having a neck 10ª to be received in a notch formed therefor in a catch 10ᶜ, pivotally mounted on the retainer 8 by means of a rivet 10ᵇ.

It is to be observed that the sleeve or member 6 being mounted on the shoulder ends of the rivets 4 is spaced and held equidistant from the sleeve or member 1, and the sleeve member 8 is split, as indicated at 10ᵇ, so as to permit the removal of this sleeve member or retainer when the catch 10ᶜ is disengaged from the neck of the rivet 10.

In the drawings accompanying this application, and more particularly in Fig. 1 thereof, I have illustrated the retainer-sleeves, which in their entirety will be hereinafter referred to as "retainers," as being of such a length as to entirely cover the spindle B of the axle A, and I have shown a plurality of balls mounted in said retainer, the sleeves comprising the retainer being supported by a plurality of rivets constructed similar to the rivet 4 heretofore described. By referring to the spindle B of Fig. 1 it will be observed that this spindle is of the same diameter its entire length, thus dispensing with the cone-shaped spindle heretofore used, and it will be seen by the construction of the retainer that the sleeves 1, 6, and 8 may be provided with a larger number of openings or apertures in which the balls are supported, and the balls 3 may be staggered in relation to one another within said retainer, whereby each ball will have a cylindrical surface to travel upon, and where the weight to be supported upon said spindle increases a greater number of balls may be placed within the retainer directly beneath the weight.

To permit the end thrust of the axle in connection with the hub and at the same time to maintain a perfect bearing between said hub and axle, I have provided the retainers 11 and 12, which are identical in construction, these retainers comprising three rings or members 14, 15, and 16. The rings are constructed upon lines similar to sleeves 1, 6, and 8, and the ring 14 is provided with a plurality of apertures 17 of such a diameter that the balls 18 will be permitted to extend through said apertures a slight distance, and the ring 15 is provided with apertures 19 of a diameter corresponding to that of the balls, while the ring 16 is provided with apertures 20, whereby the balls will be retained within the different rings and held therein by the rivets 21, which are similar in construction to the rivets 4. The retainer 11 is mounted in the annular recess K of the bearing-ring H, and the balls 18 of this retainer bear upon the shoulder carried by the nut 24, which is secured upon the threads C of the spindle, and a jam-nut 25 is employed to lock this nut upon said spindle. The retainer 12 is mounted in the annular recess J of the bearing-ring H, and the balls of said retainer bear against the shoulder 26 of said recess and upon the annular shoulder D and the collar E of the axle.

The balls must be held at points where the balls contact with the spindle and with the surrounding sleeve in order to decrease to as great an extent as possible the friction of the balls and the retainer. The sleeves 1 and 6 in the construction shown in Figs. 1 and 2 are therefore spaced apart and held by the rivets 4, the opening 7 in the sleeve being of such diameter that the balls do not contact therewith at all. The sleeve 8 in this construction acts as the retainer to hold the balls within the sleeves 1 and 6 and is necessary for this purpose. By reference, therefore, to Fig. 2 it will be observed that the point of contact of the balls with sleeves 1 and 8 is at a point on the periphery of the balls where the diameter of said balls is materially less than the greatest diameter of the balls, and consequently the friction between the balls and said sleeves 1 and 8 is very slight. This is true also of the end thrust-bearings.

In Fig. 1 of the drawings the retainers are assembled in their respective positions in connection with the spindle and hub, and to remove the same the cap 27, carried by the hub, is removed and the nuts 25 and 24 removed, at which time the retainer 11 may be readily displaced from the spindle and the sleeves 1, 6, and 8, comprising the retainer for the balls, may be pulled outwardly from the spindle B. The screw-threaded cap 28 is then removed and the axle A pulled outwardly from the hub or the hub removed from the spindle of said axle, at which time the retainer 12 may be removed therefrom. It will thus be observed that the ball-retainers may be easily and quickly removed should it be desired to cleanse the same or oil the spindle, it oftentimes not being necessary to remove the retainers. By constructing the retainers as above described the balls of the retainers will be permitted to travel in the direction that the different bearing parts revolve and a perfect bearing-surface will be provided upon the spindle for each and every ball and the cups and cones commonly used dispensed with.

I desire to call particular attention to the bearing relation which exists between the balls of the retainer and the spindle. It is a well-known fact that heretofore cone-shaped or tapering spindles have been used in connection with ball-bearings, and in this construction it has been impossible to provide an equal bearing for all balls and to sustain any given weight upon all of said balls. In the construction employed by me it will be observed that a spindle or shaft of an equal diameter throughout is used, and by mounting the balls directly upon the shaft or spindle I provide an equal bearing on each and every ball—that is, each ball will travel upon a surface of the same circumference—and the periphery of the spindle or shaft being of an equal contour or curvature its entire length each ball will travel upon a path similar to and simultaneously with the other balls. By so constructing the retainer in relation to a fixed or movable body each ball will bear and travel upon a prescribed path similar to the path followed by the other balls. In forming the sleeves comprising the retainer the apertures may be so disposed as to retain the balls in any desired position, and more particularly where the weight will bear upon said balls, it being essential that the bearing be interposed between the spindle or shaft and the weight whereby the strain and friction upon the spindle will be relieved. It will be apparent from the foregoing description that a novel and new form of bearing and spindle have been provided for vehicles and such machinery where they are employed.

It has been found by experiment that my ball-bearing is particularly adapted for use in connection with mechanism for moving very heavy weights, owing to the fact that where the same is used in connection with a cylindrical bearing-surface of even diameter throughout a two-point bearing is maintained. Heretofore in ball-bearings wherein cups, cones, or races were used it was impossible to sustain a weight upon the balls which would have a bearing upon an imaginary axle-line—that is, the pressure of a weight upon a ball would not be through the center of said ball, but would be at an angle to a line through said center. It has also been ascertained that where my improved ball-bearing comprising a retainer is used it is not necessary to adjust the same, and where the same is used in connection with car-wheels, the pressure of the weight upon said wheels being downwardly, as the boxes which are supported by the axles of said wheels become worn it is not necessary to adjust the bearing, as the same will provide an equal wearing on all sides of the axle and will at all times maintain a perfect bearing for said axle.

Another essential feature of my improved bearing resides in the fact that where the same is used upon spindles or shafts the shaft or spindle if worn will be evenly worn throughout its entire length owing to the disposition of the balls within the retainer surrounding the same.

What I claim as new, and desire to secure by Letters Patent, is—

1. The combination with an axle and its spindle portion, of a ball-bearing comprising three members surrounding the spindle of the axle, balls mounted in said members, the inner of which members is apertured to permit the balls to project therethrough into engagement with the spindle, and carries rivets, the intermediate of said members being mounted on said rivets, and having openings greater in diameter than the openings in the first-mentioned member, and the third of which members is sleeved onto the second-mentioned member and has openings to allow the balls to project therethrough, substantially as described.

2. A ball-bearing comprising three elements or members, balls mounted in said members, the inner one of said members having openings of less diameter than the balls received in said openings, and the surrounding member having openings of larger diameter than the inner member, with the outer or third member sleeved onto the second-mentioned member and having openings to receive the balls, but of less diameter than said balls.

3. The combination with an axle and its spindle portion, of sleeves concentric with the spindle and with each other, the inner of said sleeves being provided with openings, balls mounted in said openings and of greater diameter than the openings, rivets carried by said inner sleeve, the intermediate of said sleeves being mounted on said rivets and having openings of a diameter equal to the diameter of the balls, the outer of said sleeves being sleeved onto the intermediate sleeve and having openings of less diameter than the balls, means for securing said outer sleeve against independent movement, and means on the spindle for holding all the sleeves against endwise movement thereon.

In testimony whereof I affix my signature in presence of two witnesses.

BERT G. GOBLE.

Witnesses:
K. H. BUTLER.
WM. C. HEITZ.